United States Patent
Rojas Galvan et al.

(10) Patent No.: US 10,468,835 B1
(45) Date of Patent: Nov. 5, 2019

(54) USB PORT AND CABLE STORAGE ASSEMBLY

(71) Applicant: FORD GLOBAL TECHNOLOGIES, LLC, Dearborn, MI (US)

(72) Inventors: Alfonso Rojas Galvan, Mexico City (MX); Rodrigo Velasco Ramos, Mexico City (MX); Oscar Hernandez Cervantes, Naucalpan de Juarez (MX); Paul Fernando Cepeda Rode, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/954,201

(22) Filed: Apr. 16, 2018

(51) Int. Cl.
| | |
|---|---|
| *H01R 13/72* | (2006.01) |
| *H01R 13/516* | (2006.01) |
| *H01R 13/74* | (2006.01) |
| *H01R 31/06* | (2006.01) |
| *H02G 11/02* | (2006.01) |
| *H01R 13/453* | (2006.01) |

(52) U.S. Cl.
CPC .......... *H01R 13/72* (2013.01); *H01R 13/516* (2013.01); *H01R 13/74* (2013.01); *H01R 13/4538* (2013.01); *H01R 31/06* (2013.01); *H01R 2201/26* (2013.01); *H02G 11/02* (2013.01)

(58) Field of Classification Search
CPC ..... H01R 13/72; H01R 13/4538; H02G 11/02
USPC ............................................. 439/501, 4, 131
See application file for complete search history.

(56) References Cited

U.S. PATENT DOCUMENTS

| | | | | |
|---|---|---|---|---|
| 5,023,396 | A | * | 6/1991 | Bartee .................... H02G 3/185 174/486 |
| 6,435,903 | B1 | * | 8/2002 | Nelson ................... H01R 13/71 174/57 |
| 8,104,816 | B2 | | 1/2012 | Lupton, III et al. |
| 9,247,657 | B2 | * | 1/2016 | Row .................... H01R 13/516 |
| 9,257,799 | B2 | | 2/2016 | Stubbs et al. |
| 9,705,347 | B2 | * | 7/2017 | Lee ........................ H02J 7/0052 |
| 2002/0127897 | A1 | * | 9/2002 | Sharples .............. H01R 13/447 439/131 |
| 2011/0272959 | A1 | * | 11/2011 | Lupton, III ............... B60R 7/06 296/37.8 |
| 2014/0300322 | A1 | | 10/2014 | Chien |
| 2015/0343960 | A1 | | 12/2015 | Dyle |
| 2015/0380854 | A1 | * | 12/2015 | Oosterman ............ H01R 13/44 439/131 |

FOREIGN PATENT DOCUMENTS

WO   2013011419 A2   1/2013

* cited by examiner

*Primary Examiner* — Hae Moon Hyeon
*Assistant Examiner* — Justin M Kratt
(74) *Attorney, Agent, or Firm* — Vichit Chea; King & Schickli, PLLC

(57) ABSTRACT

An apparatus in the form of a USB port and cable storage assembly includes a housing, a displaceable cord cleat and a USB port carried on the cord cleat. The housing includes a cleat receiver and opposed stop receivers. The cord cleat includes a stem and a faceplate. The apparatus also includes an actuator, displacing the cord cleat toward a deployed position, a guideway on the housing and the cord cleat and a cord receiver along an outer edge of the faceplate.

8 Claims, 11 Drawing Sheets

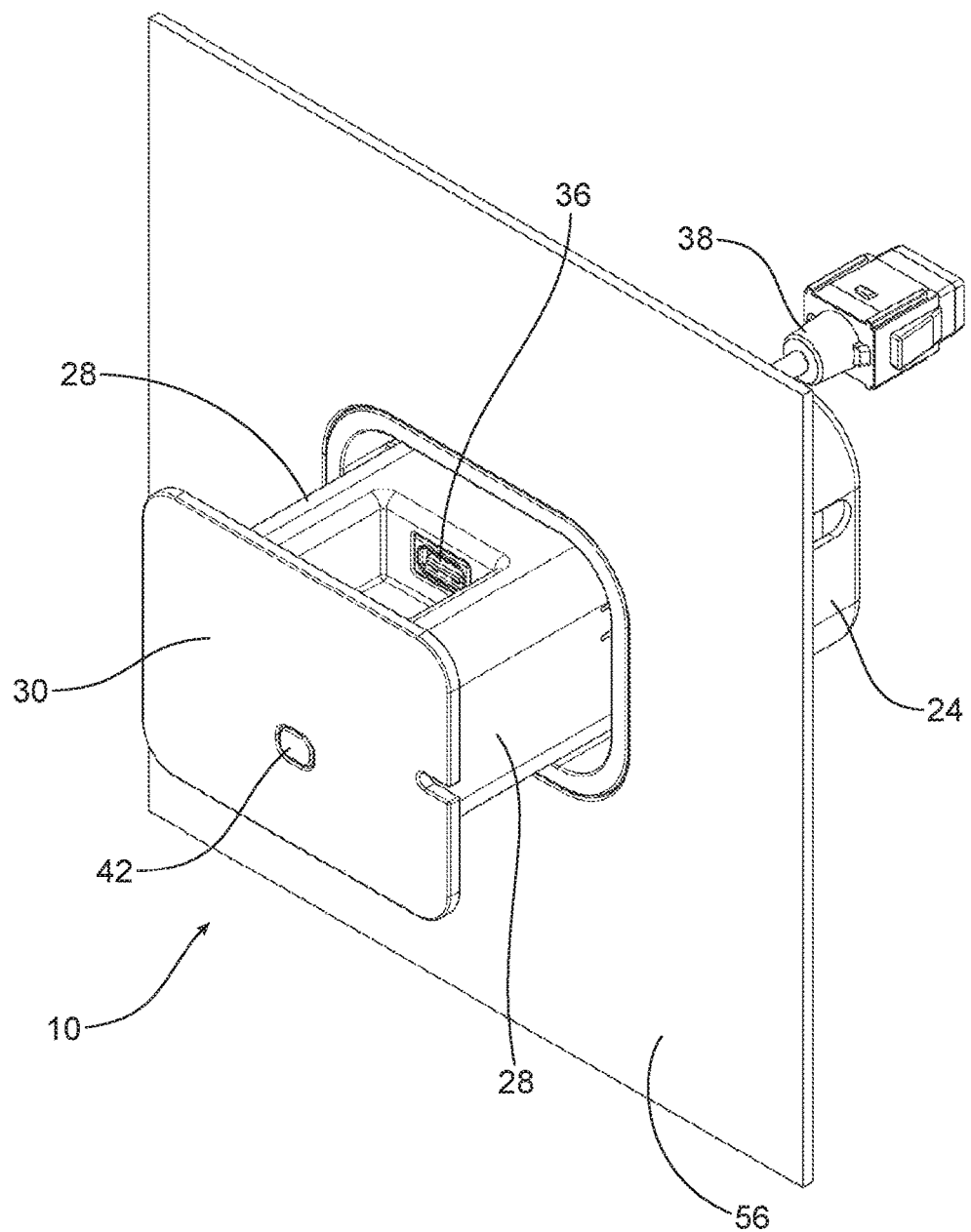

USB PORT AND CABLE STORAGE ASSEMBLY

TECHNICAL FIELD

This document relates generally to the motor vehicle equipment field and, more particularly, to a new and improved apparatus in the form of a USB port and cable storage assembly.

BACKGROUND

Motor vehicle drivers often utilize electronic devices such as smart phones and navigation devices when operating a motor vehicle. While such electronic devices are typically self powered by battery, that battery may be in need of charge in order to ensure proper operation over the duration of any particular trip in the motor vehicle. Toward that end, it is not uncommon to provide the motor vehicle with a USB port that allows for charging of the battery of the electronic device.

More particularly, a charge cord or cable is connected between the electronic device and the USB port in order to complete the charge connection. In many instances, that charge cord is much longer than required to extend from the USB port to the position where the electronic device is located in the motor vehicle. The extra length of charge cord is untidy and may become an annoyance to the driver even potentially interfering with the driver's ability to freely reach and manipulate certain of the controls of the motor vehicle. Further, the charge cord may become damaged as a result of being pinched between, for example, an armrest and the upper face of the center console or between a seat support and a seat rack.

This document relates to a new and improved apparatus in the form of a USB port and cable storage assembly that is very easy to use, provides an aesthetically pleasing appearance when in use, stows in a quick and efficient manner when not in use and provides for efficient and effective management of the charge cable at all times. As such, the apparatus represents a significant advance in the art.

SUMMARY

In accordance with the purposes and benefits described herein, a new and improved apparatus is provided. That apparatus takes the form of a USB port and cable storage assembly comprising a housing, a cord cleat and a USB port. The cord cleat is carried by the housing and is displaceable between a stowed position and a deployed position. The USB port is carried on the cord cleat.

The apparatus may further include an actuator that displaces the cord cleat toward the deployed position. In addition, the apparatus may include a guideway. That guideway may include opposed rails carried on the housing, and opposed rail guides carried on the cord cleat.

The cord cleat may include a stem and a face plate. That face plate may be carried on a distal end of the stem. The face plate may include a cord receiver along an outer edge thereof.

In at least one of the many possible embodiments of the apparatus, the opposed rail guides extend along the stem. Further, the housing may include opposed stop receivers. In addition, the stem may include opposed stops that slide along the opposed stop receivers as the cord cleat is displaced between the stowed position and the deployed position. Further, the opposed stops may be carried on resilient lugs.

In at least one of the many possible embodiments of the apparatus, the stem may include a cavity and the USB port may be provided in the cavity behind the face plate. Further, the face plate may include a pushbutton receiver. In addition, the actuator may include pushbutton engaging in the pushbutton receiver in the face plate. In at least some of the many possible embodiments of the apparatus, the actuator may be a spring-loaded damper.

The housing may include an inner section held inside an outer section. A cleat receiver may be defined between the outer section and the inner section. The stein of the cord cleat may be received in the cleat receiver.

In at least some of the many possible embodiments of the apparatus the inner section may be substantially U-shaped. The opposed rails may be carried on the inner section and the opposed stop receivers may be carried on the outer section. Further, the opposed rail guides may project from a first face of the stem and the opposed stops may project from a second face of the stem in the opposite direction.

In the following description, there are shown and described several preferred embodiments of the apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof. In the drawing figures:

FIG. 3B is a view similar to FIG. 3A but illustrating the apparatus received in a trim panel of a motor vehicle.

Reference will now be made in detail to the present preferred embodiments of the apparatus, examples of which are illustrated in the accompanying drawing figures.

DETAILED DESCRIPTION

Figure 1:
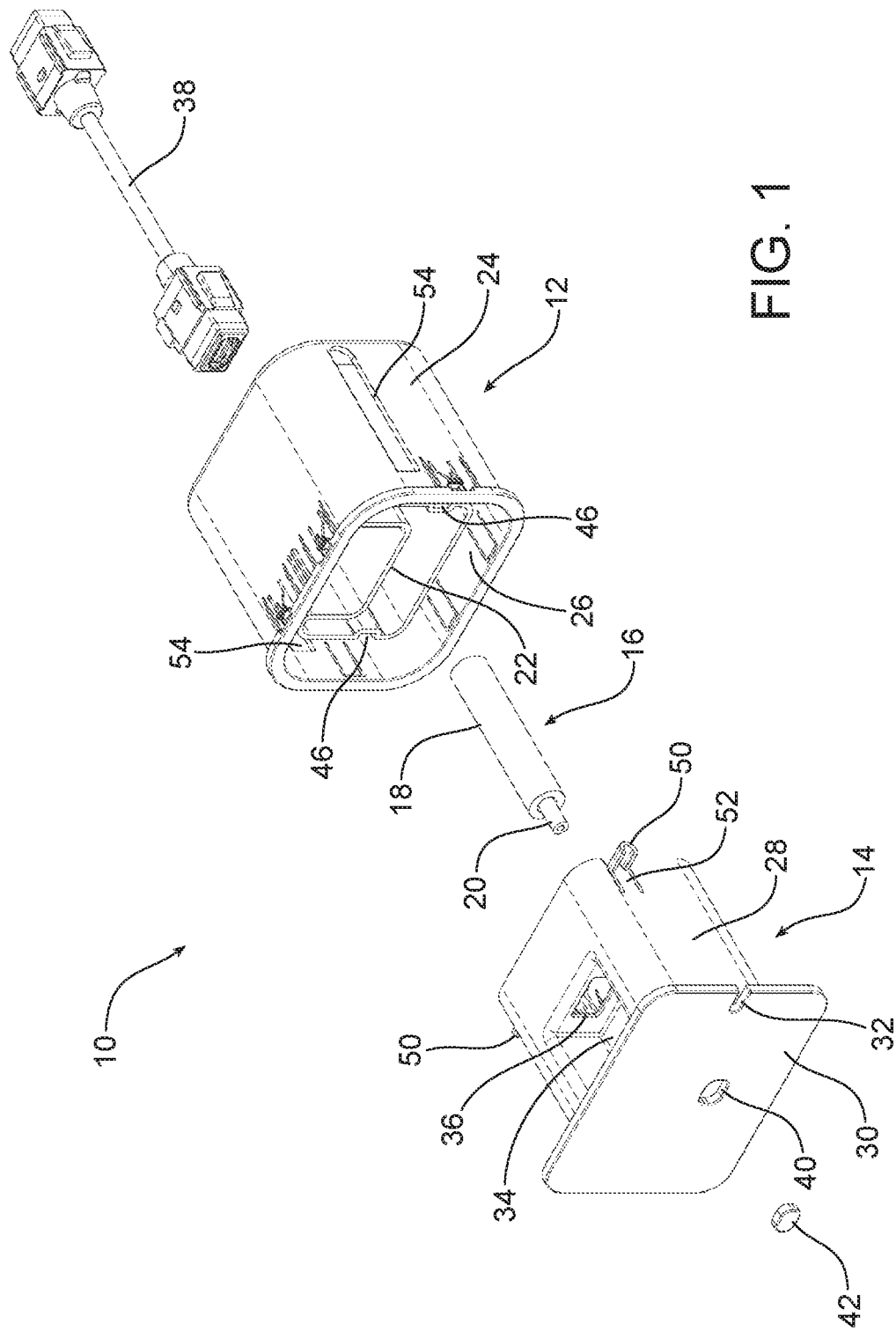
FIG. 1 is an exploded perspective view of the apparatus.
Figure 2A:
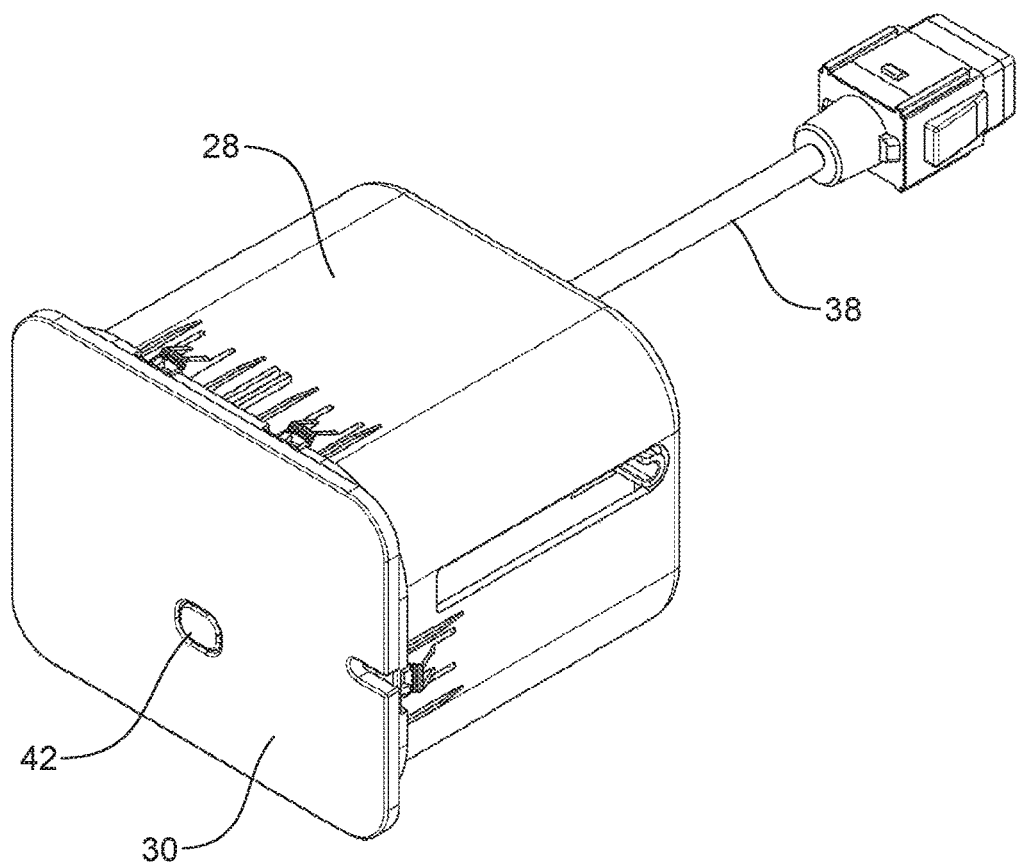
FIG. 2A is a perspective view of the assembled apparatus wherein the cord cleat thereof is in the stowed position.

Reference is now made to FIG. 1, illustrating the new and improved apparatus 10 which takes the form of a USB port and cable storage assembly. The apparatus 10 includes a housing 12, a cord cleat 14 and an actuator 16. The cord cleat 14 is carried by the housing 12 and is displaceable between a stowed position, best illustrated in FIGS. 2A-2C, and a deployed position, best illustrated in FIGS. 3A-3C. In the illustrated embodiment, the actuator 16 comprises a spring-loaded damper 18 having an extendable piston 20 adapted to displace the cord cleat 14 toward the deployed position.

Figure 5A:
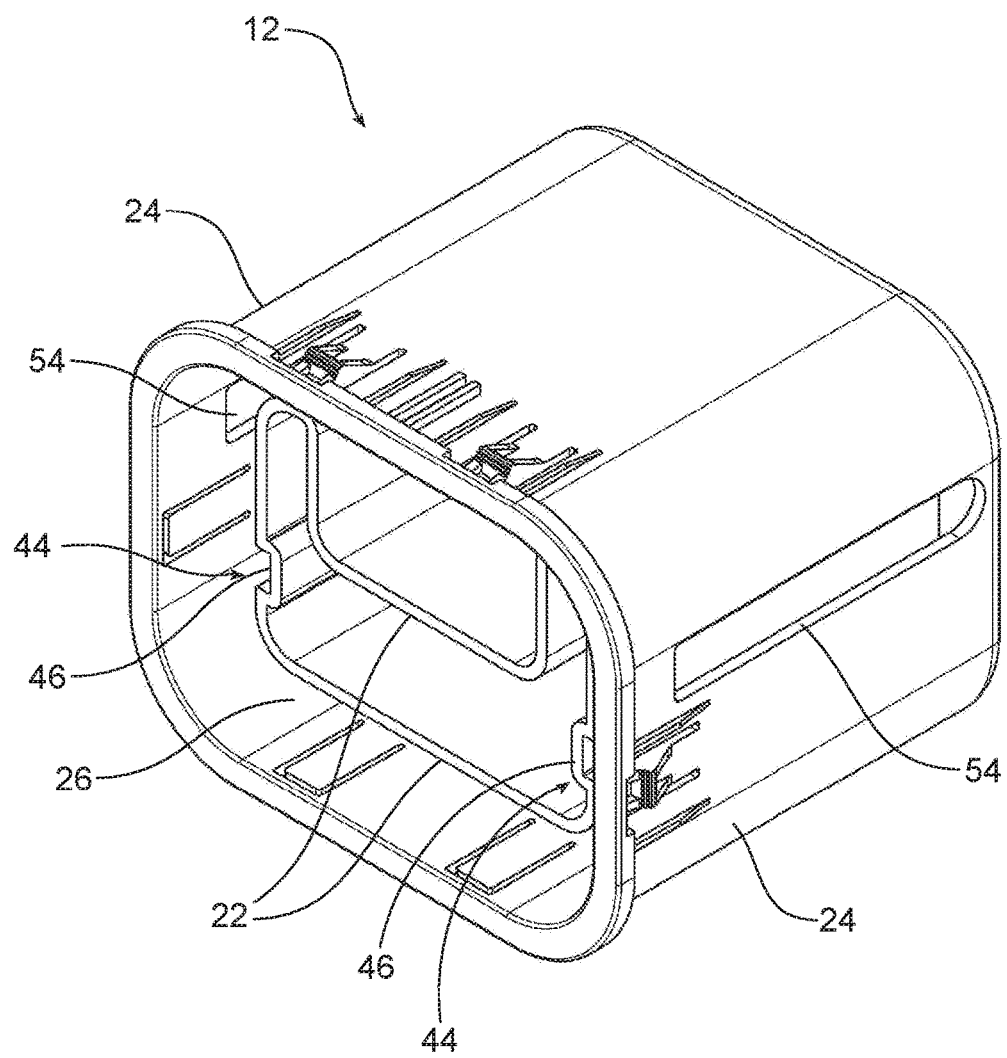
FIG. 5A is a detailed front perspective view of the housing.
Figure 5B:
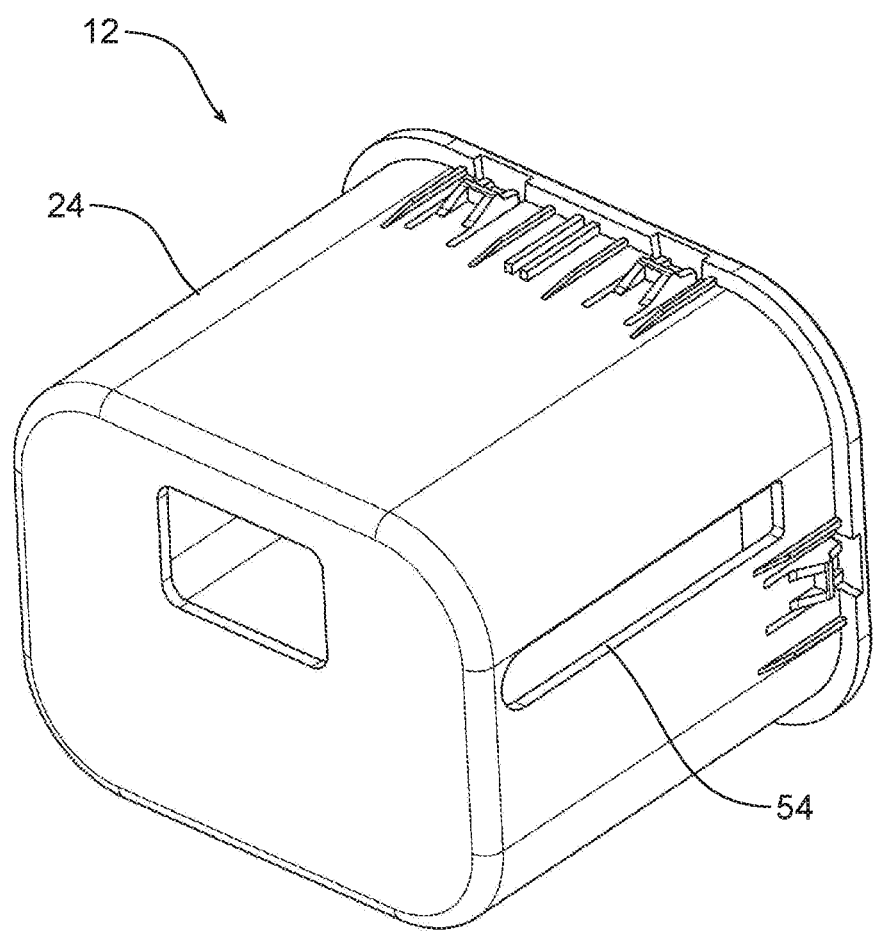
FIG. 5B is a rear perspective view of the housing.

As best illustrated in FIGS. 1 and 5A, the housing 12 includes an inner section 22 held inside the outer section 24. In the illustrated embodiment, the inner section 22 is substantially U-shaped. A cleat receiver 26 is defined between the inner section 22 and the outer section 24.

The cord cleat 14 includes a stem 28 and a face plate 30. The face plate 30 is carried on the distal end of the stem 28. The face plate 30 includes a cord receiver 32 along an outer edge thereof. The stem 28 includes a cavity 34. A USB port 36 is provided in the cavity 34 behind the face plate 30. A USB connector 38 connects the USB port 36 to a power source and, optionally, to a onboard controller of the motor vehicle.

As also illustrated, the face plate 30 includes a pushbutton receiver 40. The actuator includes a pushbutton 42 that is received in the pushbutton receiver 40 and connected to the piston 20. One pushes and then releases the pushbutton 42 in order to displace the cord cleat 14 from the stowed position illustrated in FIGS. 2A-2C to the deployed position illustrated in FIGS. 3A-3C.

The apparatus 10 further includes a guideway, generally designated by reference numeral 44. In the illustrated embodiment, the guideway 44 includes opposed rails 46 carried on the housing 12 (see FIG. 5A) and opposed rail guides 48 carried on the cord cleat 14 (see FIG. 4B). More particularly, as best illustrated in FIG. 5A, the opposed rails 46 are carried on the inner section 22 of the housing 12. The opposed rails 46 extend along the stem 28 and are received and slide along the opposed rails 46 of the housing 12. More particularly, the opposed rail guides 48 project from an inner or first face of the stem 28.

Figure 4A:
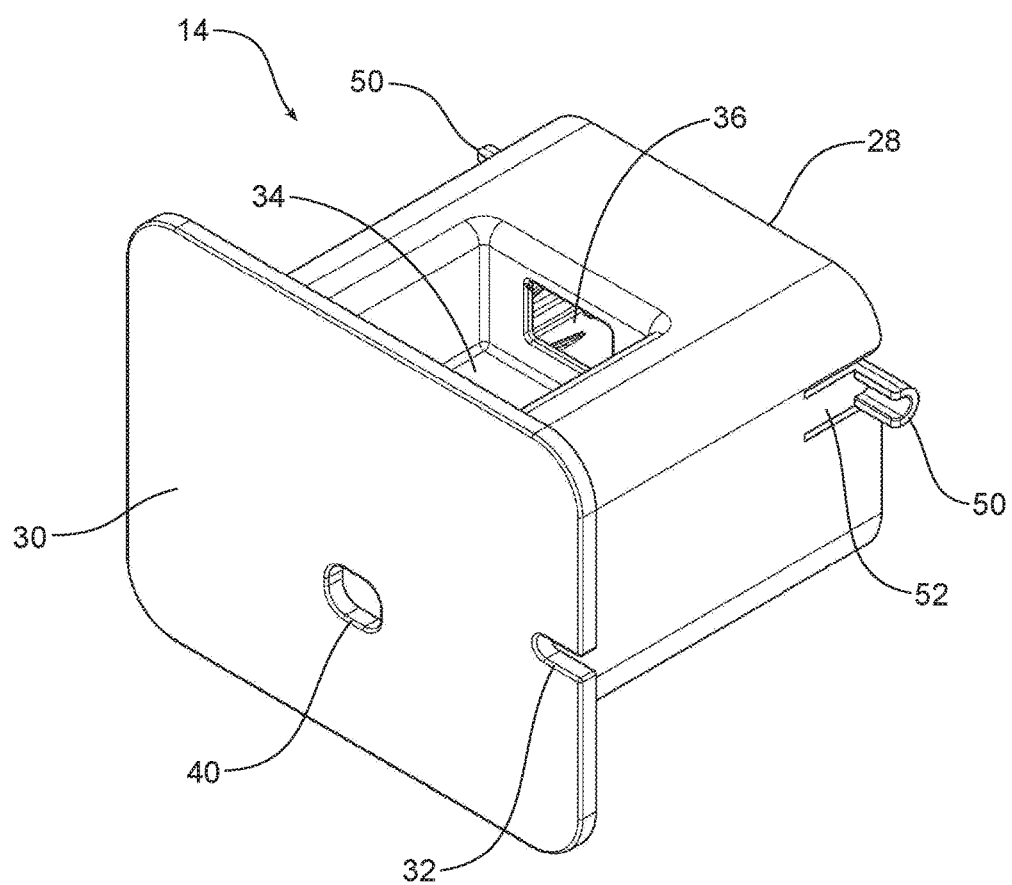
FIG. 4A is a detailed front perspective view of the cord cleat.
Figure 4B:
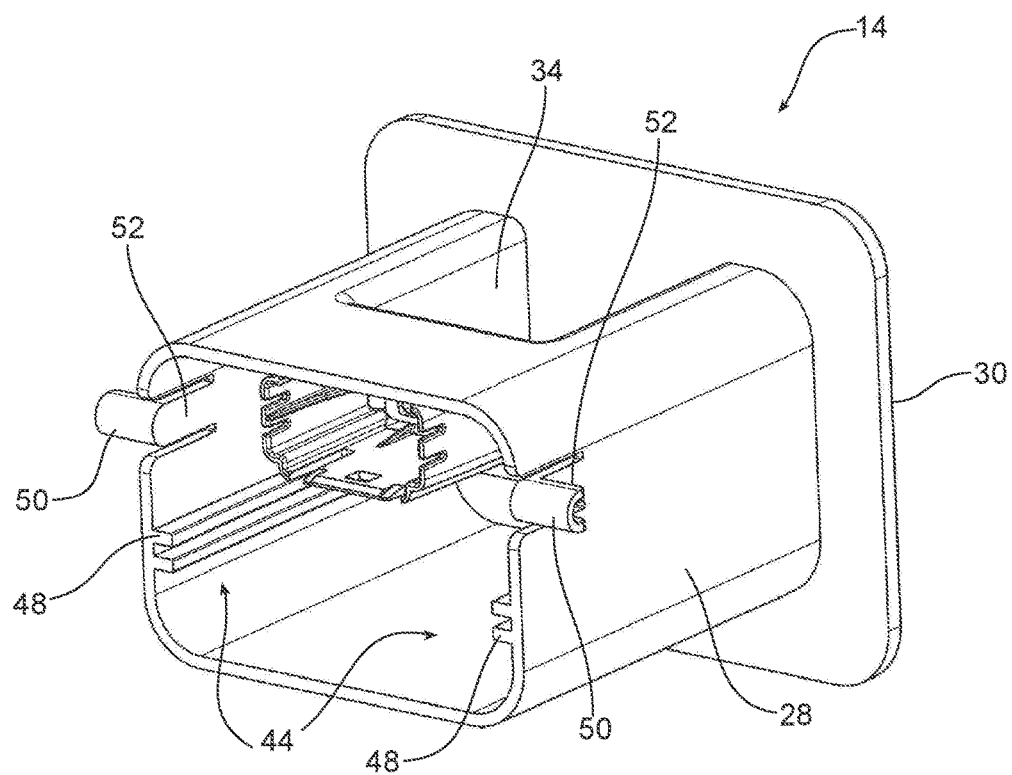
FIG. 4B is a detailed rear perspective view of the cord cleat.

As best illustrated in FIGS. 4A and 4B, the stem 28 also includes opposed stops 50. Each stop 50 is carried on a resilient lug 52 integrally formed with the stem 28. The housing 12 includes cooperating opposed stop receivers 54. In the illustrated embodiment the opposed stop receivers 54 comprise elongated slots carried on or provided in the outer section 24 of the housing 12.

As best illustrated in FIG. 4B, the opposed rail guides 48 project from the inner or first face of the stem 28 while the opposed stops 50 project outwardly from the second or outward face of the stem. When the apparatus 10 is assembled, the stem 28 of the cord cleat 14 is received in the cleat receiver 26 formed between the inner section 22 and outer section 24 of the housing 12. The opposed rail guides 48 are received in and slide along the opposed rails 46 of the housing 12. Further the opposed stops 50 are received in and slide along the elongated stop receivers 54 of the housing 12. Here it should be appreciated that the resilient lugs 52 bend inward to allow initial insertion of the cord cleat 14 into the housing 12 and then spring back to their normal position once the opposed stops 50 clear the outer section 24 and are aligned with the stop receivers 54. The opposed stops 50 engage the end of the stop receivers 54 and prevent the cord cleat 14 from being withdrawn from the housing 12 following assembly. Thus, it should be appreciated that the opposes stops 50 establish the fully deployed position illustrated in FIGS. 3A-3C.

Figure 2B:
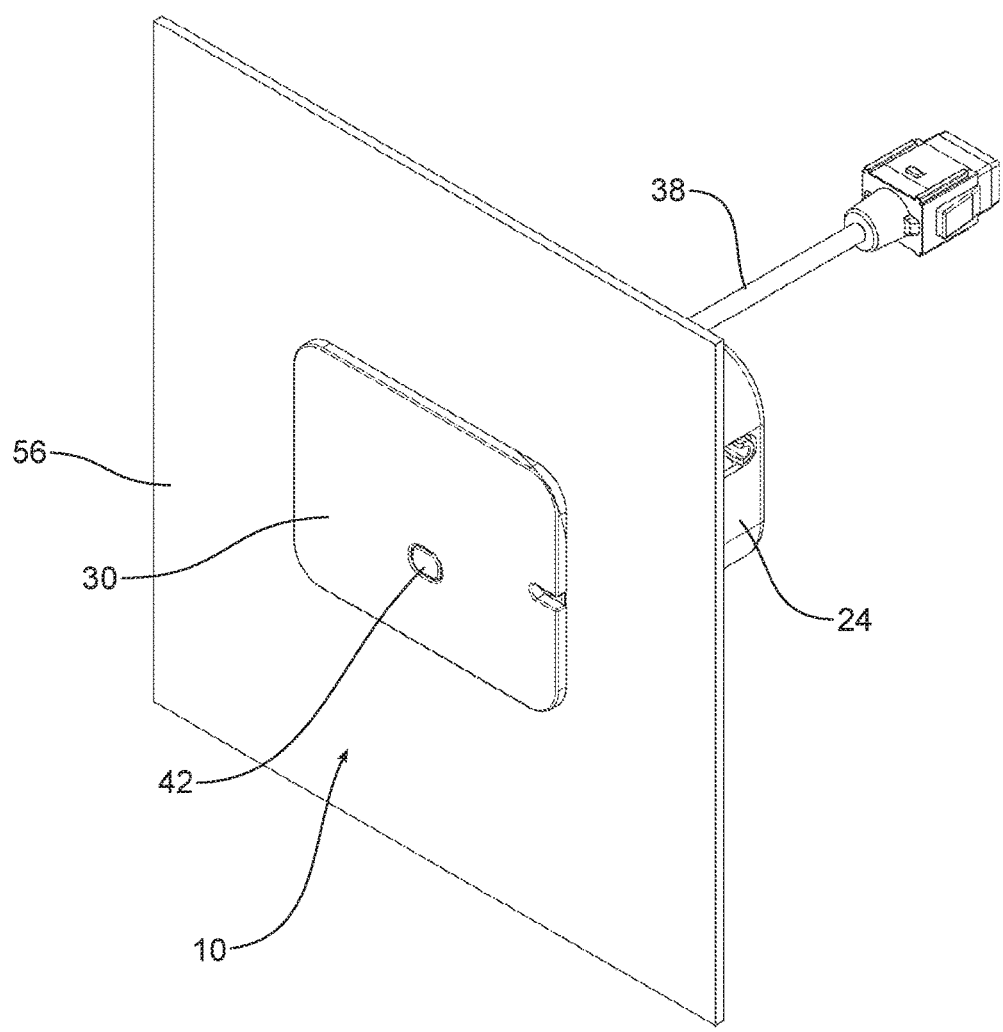
FIG. 2B illustrates the apparatus held in a trim panel of a motor vehicle with the cord cleat in the stowed position.
Figure 3A:
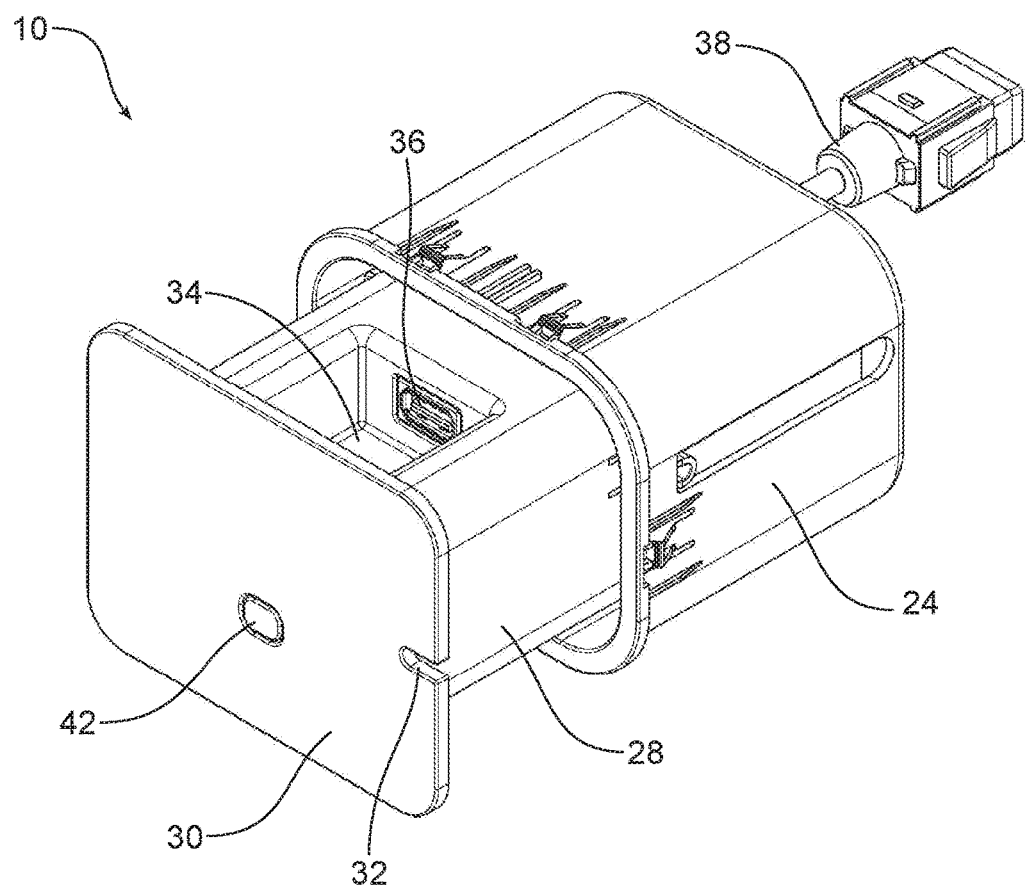
FIG. 3A is a detailed perspective view of the apparatus illustrating the cord cleat in the deployed position.
Figure 3C:
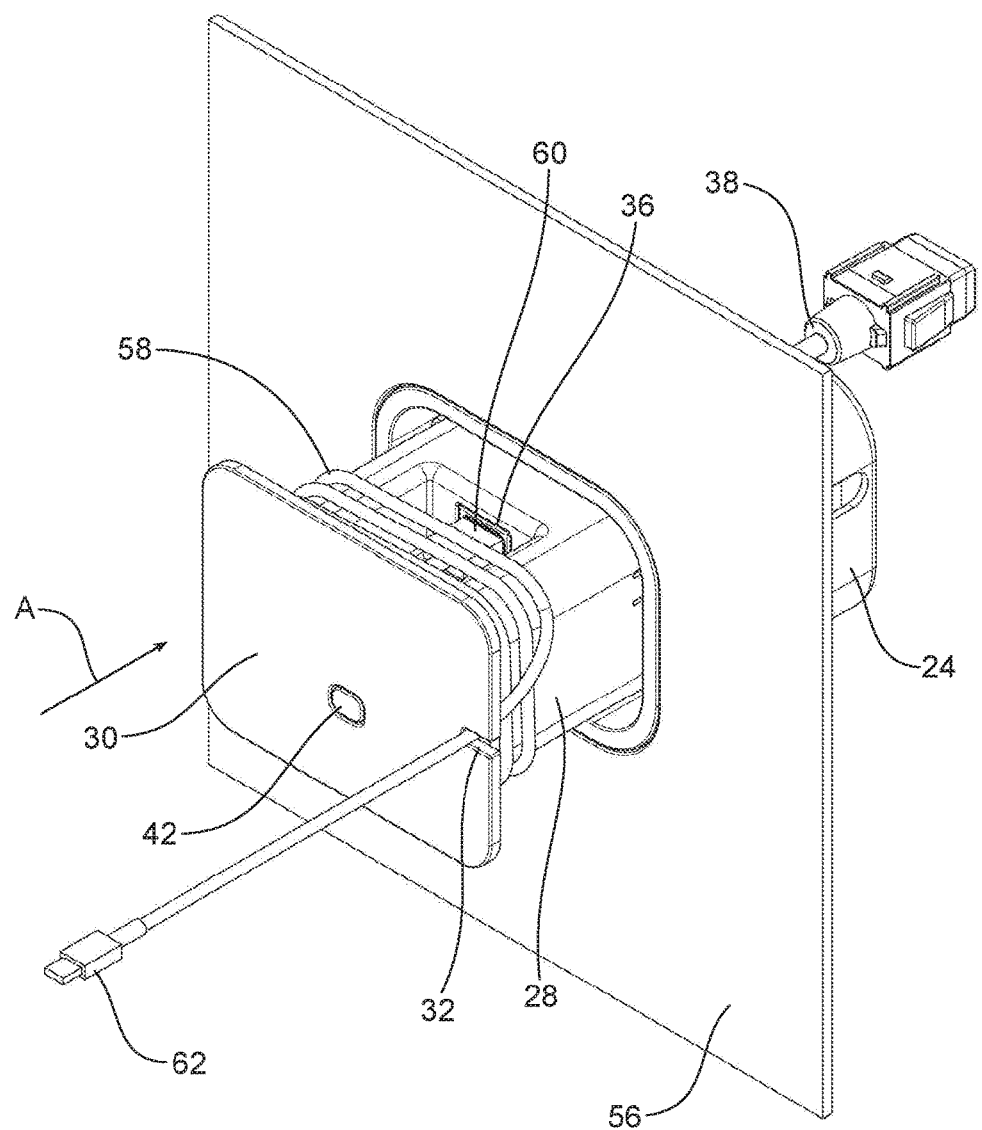
FIG. 3C is a view similar to FIG. 3B but illustrating a charge cord having one end connected to the USB port carried on the cord cleat, an intermediate section of the charge cord wrapped around the stem of the cord cleat and the distal end of the charge cord passing through the cord receiver in the face plate of the cord cleat.

The apparatus 10 is easy to use. FIG. 2B illustrates the apparatus 10 installed within an aperture of a trim panel 56. When the cord cleat 14 is in the stowed position, the face plate 30 may rest against or be flush with the front of the trim panel 56 thereby providing an aesthetically pleasing appearance. When one wishes to displace the cord cleat 14 into the deployed position, one depresses and releases the pushbutton 42. In response, the actuator 16 displaces the cord cleat 14 to the deployed position as illustrated in FIG. 3B. One may then connect the charge cord 58 to the now-exposed USB port 36 by plugging the connector 60 at one end of the charge cord 58 into the USB port 36. The charge cord 58 may then be wrapped around the stem 28 in the manner illustrated in FIG. 3C. When a desired length of charge cord 58 remains free of the stem 28, the charge cord may be inserted into the cord receiver 32 formed in the edge of the face plate 30. This leaves a desired length of charge cord 58 extending from the face plate 30.

Figure 2C:
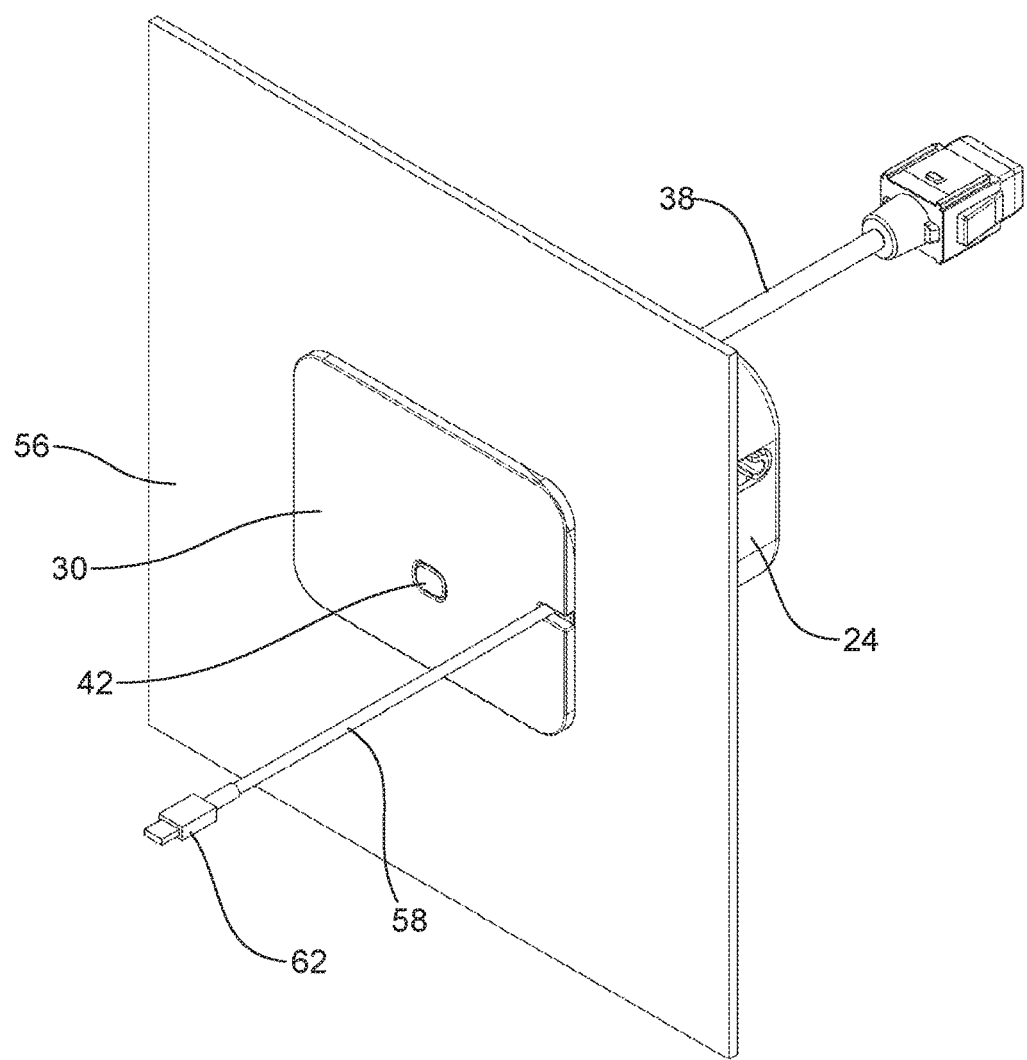
FIG. 2C is a view similar to FIG. 2B but illustrating how a charge cord may pass through the cord receiver in the face plate of the cord cleat and project from the apparatus and the trim panel in a manner that allows attachment to an electronic device.

Next, one depresses the face plate 30 in the direction of action arrow A until the cord cleat 14 is returned to the stowed position illustrated in FIG. 2C where it is locked in place until one again depresses the pushbutton 42 to release the actuator 16. As should be appreciated from reviewing FIG. 2C, only the desired length of charge cord 58 extends from the face plate 30 of the apparatus 10 and the trim panel 56. An electronic device (not shown) may then be connected to the device connector 62 at the distal end of the charge cord 58 with all extra cord or slack wrapped around the stem 28 where it is concealed from view. Thus, the cord 58 is maintained tidy and out of the way so as to be protected from inadvertent damage. Further, any annoyance the cord might provide the driver when operating other controls of the motor vehicle is substantially avoided.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
   a housing including a cleat receiver and opposed stop receivers;
   a cord cleat carried by said housing, said cord cleat including a stem and a face plate wherein said stem includes opposed stops that slide along said opposed stop receivers as said cord cleat is displaced between a stowed position wherein said stem is retracted into said cleat receiver and a deployed position wherein said stem projects from said cleat receiver;
   a USB port carried on said cord cleat;
   an actuator displacing said cord cleat toward said deployed position;
   a guideway on said housing and said cord cleat, said guideway including opposed rails carried on said housing and opposed rail guides extending along said stem; and a cord receiver along an outer edge of said face plate wherein said opposed stops are carried on resilient lugs and said stem includes a cavity and said USB port is in said cavity behind said face plate.

2. The apparatus of claim 1, wherein said actuator is a spring-loaded damper.

3. The apparatus of claim 2, wherein said face plate includes a push button receiver and said actuator includes a push button engaging in said push button receiver in said face plate.

4. The apparatus of claim 3, wherein said housing includes an inner section held inside an outer section.

5. The apparatus of claim 4, wherein said cleat receiver is defined between said outer section and said inner section.

6. The apparatus of claim 5, wherein said inner section is substantially U-shaped.

7. The apparatus of claim 6, wherein said opposed rails are carried on said inner section and said opposed stop receivers are carried on said outer section.

8. The apparatus of claim 7, wherein said opposed rail guides project from a first face of said stem and said opposed stops project from a second face of said stem.

\* \* \* \* \*